United States Patent [19]

Shoji et al.

[11] Patent Number: 5,034,673
[45] Date of Patent: Jul. 23, 1991

[54] METHOD OF MOVING AND GUIDING GOLF CART

[75] Inventors: Hiroo Shoji, No. 34-7, Terawake, 2-chome, Kamakura-shi, Kanagawa-ken; Masamori Koseki, No. 13-15, Higashishinmachi, 1-chome, Itabashi-ku, Tokyo, all of Japan

[73] Assignees: Takeshi Miura, Saitama; Hiroo Shoji, Kanagawa; Masamori Koseki, Itabishi, all of Japan

[21] Appl. No.: 495,602

[22] Filed: Mar. 19, 1990

[30] Foreign Application Priority Data

Aug. 25, 1989 [JP] Japan .................... 1-217220

[51] Int. Cl.$^5$ ............................. G05D 1/02
[52] U.S. Cl. ..................... 318/587; 180/168
[58] Field of Search ........... 318/580, 587; 180/167, 180/168, 169; 364/424.01, 424.02

[56] References Cited

U.S. PATENT DOCUMENTS

| 3,609,678 | 9/1971 | Fayling | 180/167 X |
| 3,714,625 | 1/1973 | Fayling | 180/167 X |
| 4,800,978 | 1/1989 | Wasa et al. | 318/580 X |

FOREIGN PATENT DOCUMENTS

| 59-165110 | 9/1984 | Japan | 318/587 |
| 61-224009 | 10/1986 | Japan | 318/587 |
| 62-111306 | 5/1987 | Japan | . |
| 1-200416 | 8/1989 | Japan | 180/168 |

Primary Examiner—Bentsu Ro
Attorney, Agent, or Firm—Michael J. Striker

[57] ABSTRACT

A method of moving and guiding a cart on a course, comprising the step of burying magnetic elements under a ground surface of the course to form a marker line in a moving direction of the cart. The magnetic elements comprise different poles defining one of S-shaped and zigzag-shaped routes and a predetermined route of a cart movement. A pole polarity is sensed for switching movement of the cart between the one of S-shaped and zigzag-shaped routes and the predetermined route for moving the cart along the marker line.

1 Claim, 3 Drawing Sheets

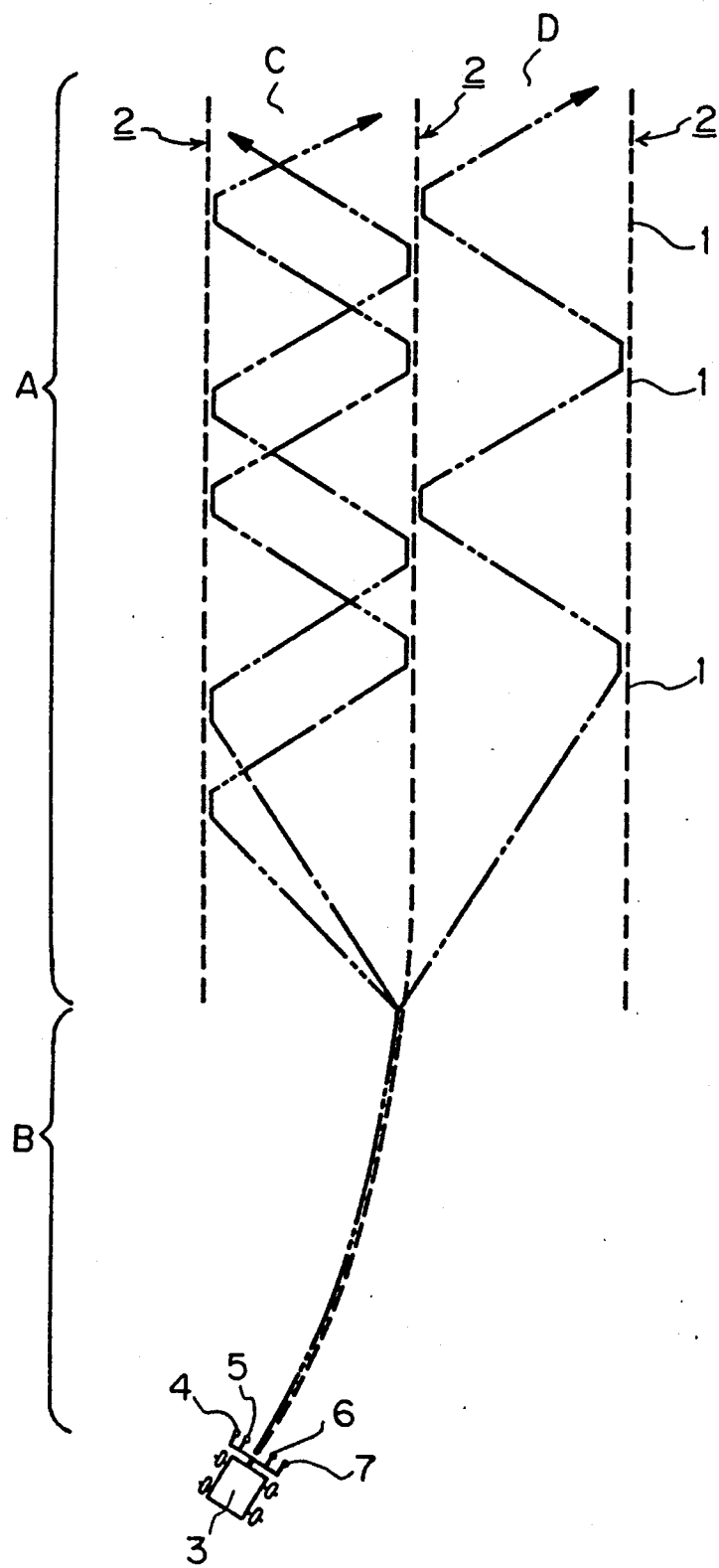
FIG_1

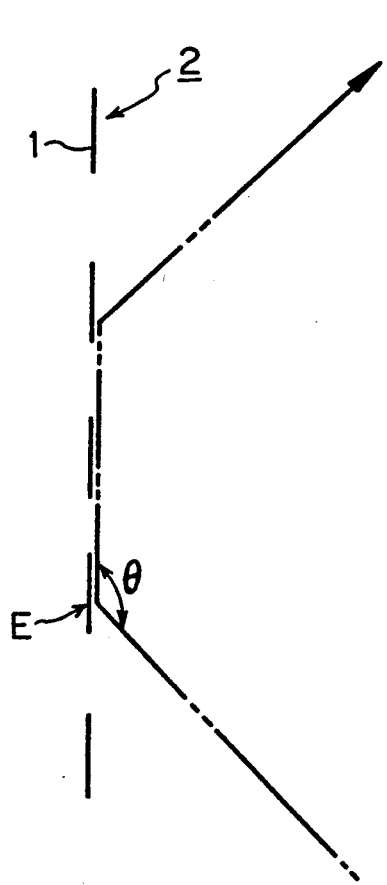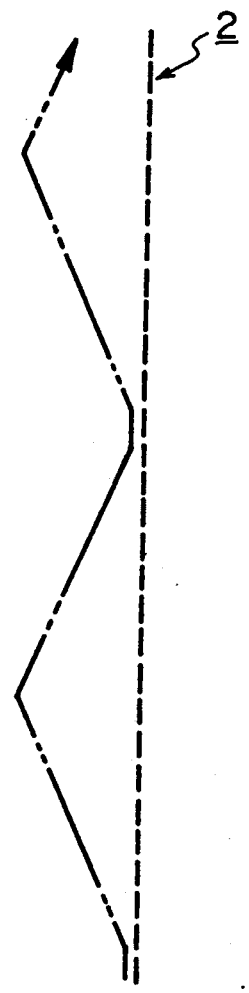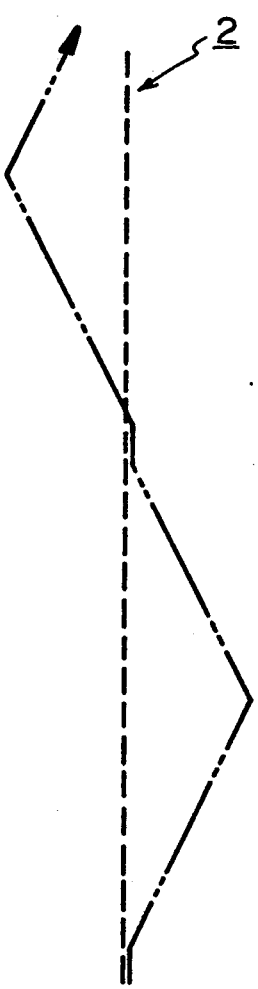

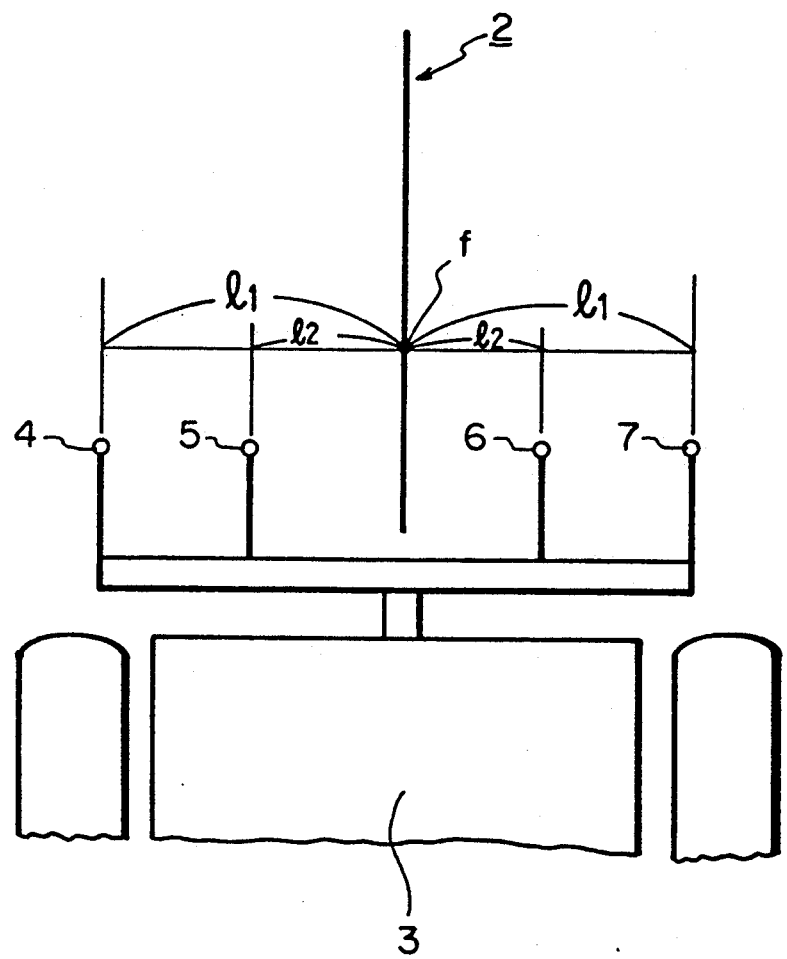
FIG_5

METHOD OF MOVING AND GUIDING GOLF CART

BACKGROUND OF THE INVENTION

The present invention relates to a method of guiding an operatorless car on a golf course.

A method of moving and guiding an operatorless cart by automatically switching the movement of a cart between a predetermined route movement and an S-shaped or zigzag-shaped movement is disclosed in Japanese Laid-Open Application No. 62-111,306 by applicants herein. According to the known method, a magnetic element is buried under the ground surface to form a marker line. Sensing means of the cart senses the marker line to drive the cart without an operator. In particular, there are independently provided marks for switching the movement on the marker line, and the sensing means of the cart is caused to sense them to switch the movements of the cart between the S-shaped or zigzag-shaped movement and the predetermined route movement along the marker line.

According to this technique, it is possible to move the car along an S-shape or zigzag-shape route on the fairway to avoid damages to the ground and the lawn, and move the cart along the predetermined route when the cart is to be moved as soon as possible, for example, on a road connection to a next hole. Since the movement is automatically switched, complicated operations of the cart are not necessary. In addition, the operatorless cart may be moved dependent on purposes of the golf course, and very useful effects are achieved.

However, when this technique is used, it is not only necessary to bury a magnetic element for forming a marker line but there is also a need to separately provide a switching mark for moving the cart, and its provision is labor-consuming.

Sensing means is required for reading two marks, a marker line and a switching mark, and this makes the structure of the sensing means complicated.

In addition, when the above technique is utilized, construction costs are relatively expensive, and this presents a problem.

SUMMARY OF THE INVENTION

The object of the invention is to simplify automatic switching of the cart during its movement.

The object of the invention is achieved by providing a method of moving and guiding a cart having the steps of burying a magnetic element under the ground surface to form a marker line in a moving direction, and magnetically sensing the marker line to guide the cart. To switch the movements of the cart between an S-shaped or zigzag-shaped movement along the marker line and a predetermined route movement along the marker line, the pole of the marker line is varied.

The present invention both as to its construction so to its mode of operation, together with additional objects and advantages thereof, will be best understood from the following detailed description of preferred embodiments when read with reference to the accompanying drawings.

BRIEF DESCRIPTION OF THE DRAWINGS

FIG. 1 is an explanatory view showing a cart moving route obtained with a moving and guiding method according to the present invention;

FIG. 2 is an explanatory view of conversion of a steering angle in case of moving a cart along an S-shape or a zigzag-shape route;

FIG. 3 is an explanatory view showing the case of moving a cart along an S-shape or zigzag-shape route only at one side of a marker line;

FIG. 4 is an explanatory view showing of the case of moving a cart along an S-shape or a zigzag-shape route across the marker line; and FIG. 5 is an explanatory view of the position of the cart in case of moving it along a predetermined route.

DETAILED DESCRIPTION OF PREFERRED EMBODIMENTS

As shown in FIG. 1, a magnetic element 1 is buried at a suitable depth under the ground surface in the golf course to form a marker line 2 of a cart 3 in a moving direction. In this case, the pole of a zone A for moving the cart has an S-shape or zigzag-shape, and the pole of a zone B for moving the cart along a predetermined route of the marker line 2 is differentiated, and the magnetic element is buried. In this embodiment, in the zone B for moving the cart along the predetermined route, an S pole is buried, while in the zone A for moving the cart along the S-shape or zigzag-shape route, an N pole is buried. The zone B for moving the cart along the predetermined route is composed of a single row, and the zone A for moving the cart along the S-shape or zigzag-shape is composed of a plurality of rows, or a single row as shown in FIGS. 3 and 4. The marker lines 2 are so provided as to draw a suitable curve in response to the ground profile of each hole.

A remote control receiver is mounted in the cart 3 to start or stop the cart, and a plurality of magnetic sensors 4 to 7 are provided at the head of the cart 3. The magnetic sensors 4 to 7 are also used to detect the intensity of the magnetic force, in addition to the detection of the pole of the magnetic element buried. In this embodiment, two poles are provided correspondingly at the right and left sides.

A controller (not shown) for switching the movements of the cart 3 and steering the cart is contained in the cart 3.

The controller has a pole discriminator, which discriminates the poles sensed by the magnetic sensors 4 to 7 to automatically select the predetermined route movement or the S-shaped or zigzag-shaped movement. In this embodiment, as described above, the zone for moving the cart along the S-shape or zigzag-shape route of the marker line 2 is set with the N pole, and the zone for moving the cart along the predetermined route is set with the S pole. Thus, when the pole discriminator judges the N pole, the cart is controlled to select the S-shaped or zigzag-shaped movement, and when the pole discriminator determines the S pole, the cart is controlled to select the predetermined route movement. Accordingly, when the pole of the marker line 2 is sensed by the magnetic sensors 4 to 7 and the pole discriminator, the cart is automatically switched between the S-shaped or zigzag-shaped movement and the predetermined route movement.

The control of moving the cart 3 along the S-shape or zigzag-shape route provides for movement of the cart 3 between a plurality of parallel marker lines (hereinafter referred to as "a moving road surface"), and when the magnetic sensors 4 to 7 of the cart 3 sense any one marker line 2, the cart 3 is converted to the steering angle of other line direction. The conversion of the steering angle of the cart may be conducted at the ground point (e) where the marker line 2 is sensed, but in the embodiment shown in FIG. 2, the conversion is conducted after the cart is moved along the marker line 2 from the marker line sensing ground point (e) for several seconds. According to this steering conversion, the entering angle of the cart 3 to the marker line 2 can be positively detected, and even if the marker line 2 is curved, the steering angle responsive to the curve can be converted, thereby stabilizing the S-shaped or zig-zag-shaped movement, Thus, an encoder for detecting the actual steering angle to feed back the numeric value to the controller is provided in the cart 3. In this embodiment, as shown in FIG. 1, three marker lines 2 are provided in parallel to form two moving road surfaces. Thus, after the cart 3 enters the left or right moving road surfaces C or D while moving in the predetermined route, the cart 3 moves along the S-shape or zigzag-shape route along the road surface C or D.

In the embodiment described above, in the zone A for moving the cart along the S-shape or zigzag-shape route, a plurality of marker lines 2 is provided. In addition, it may be also considered to form a single row of the marker line 3. In connection with the control in the case of the single row of the marker line 2, there are considered two ways of control for moving the cart along the S-shape or zigzag-shape route at one side of the marker line 2 as shown in FIG. 3, and of control for moving the cart along the S-shape or zigzag-shape across the marker line 1 as shown in FIG. 4. More specifically, in the former case, when the magnetic sensors 4 to 7 of the cart 3 sense the marker line 2, they convert the steering angle of the cart 3 in an opposite direction. Then, after several seconds from when the cart 3 is moved, the steering angle is again converted to the opposite direction. In the latter case, when the magnetic sensors 4 to 7 sense the marker line 2, the steering angle is converted in the opposite direction after several seconds. As the controller in the above embodiment, a microcomputer containing a random number table in which the steering angle to be converted is set in an arbitrary range, is employed to automatically vary the steering angle to be converted in case of starting moving the cart along the S-shape or zigzag-shape route, thereby moving the cart in along a random S-shape or zigzag-shape route.

On the other hand, the control of the predetermined route movement is conducted by detecting the magnetic force of the marker line 2 after the pole of the zone B for moving the cart 3 along the predetermined route of the marker line 2 is read by the magnetic sensor 4 to 7 of the cart 3. More specifically, the magnetic sensors 4 to 7 disposed at the right and left of the head of the cart 3 detect the intensity of the magnetic force to guide the cart 3 to the position where the magnetic forces detected by the corresponding right and left magnetic sensors become equivalent, i.e., as shown in FIG. 5, the center line f in the case that the corresponding left and right magnetic sensors 4, 7 and 5, 6 are connected by a linear line is disposed just on the marker line 2. Accordingly, when the cart 3 is moved at this position, it can be moved in the predetermined route along the marker line.

The controller of this embodiment also controls the speed of the moving cart. In this case, an oblique sensor for measuring the longitudinal or lateral inclination of the cart 3 is separately provided to automatically decelerate/accelerate the cart 3 in response to the inclination. The cart 3 can be automatically moved in the hole of various ground surface shape such as an ascent or a descent under the control of the oblique sensor.

The operation of the embodiment of the present invention described above, will be described with reference to FIG. 1. When the player transmits a start signal by a remote control oscillator (not shown) held by the player, the cart 3 starts moving. When the magnetic sensors 4 to 7 of the cart 3 read the pole (S pole) of the predetermined route movement zone B of the marker line 2, the cart 3 is moved along the marker line 2. Thereafter, when the pole (N pole) of the zone A for moving the cart along the S-shape or zigzag-shape is sensed, the cart 3 moves along the S-shape or zigzag-shape route on any moving road surface C or D. As described above, the cart 3 moves while being automatically switched between the S-shaped or zigzag-shaped movement and the predetermined route movement each time the pole of the marker line 2 is altered.

When the magnetic sensors 4 to 7 are constructed to read the array of the poles of the marker lines 2 to sense the specific array, if automatic stop and start can be performed, the complexity of the operation is reduced to be advantageous. For example, when the array of the poles of the magnetic elements for forming the marker lines 2 is "... SSNNSS", the automatic stop of the cart is effected. Particularly, when it is contemplated to control starting of the cart at random angle in case of moving the cart along the above-mentioned S-shape or zigzag-shape route, the cart can be moved to a desired place at random, thereby more effectively guiding of the cart on the golf course is achieved.

According to the embodiment of the present invention as described above, the switching of the cart movements can be automatically performed to move the cart along the S-shape or zigzag-shape route on the fairway. The ground and the lawn are thereby protected from being damaged, and the cart moves along the predetermined route on the connection road to the next hole at a place required to move the cart as fast as possible. The cart moves in response to the objects in the hole.

Further, since erection of structural means on the ground is not required, it does not disturb playing, and no sight is lost.

Moreover, since the formation of the marker line as carrier moving and guiding means is effected by burying the magnetic element of either pole under the ground, the construction cost in case of using this technique may be low, and since the cart can be automatically switched without operator, the labor cost can be saved to provide large economic advantage of the entire golf course.

According to the present invention, the movement of the cart between the S-shaped or zigzag-shaped movement and the predetermined route movement can be very easily switched by only changing the magnetic pole.

For the formation of the marker line, it is enough to bury the magnetic substance of either magnetic pole and it is easy.

Further, the sensors are sufficient to read the buried magnetic substance, so that the structure is simple.

In addition, because of the easy technique, the construction cost may be low if the present technique is employed, and the personal expenses may be saved, since the cart is moved by being switched automatically, and the golf course as a whole has large economical merits.

While the invention has been illustrated and described as embodied in a method of moving and guiding a cart, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of moving and guiding a golf cart on a course, comprising the steps of providing magnetic means comprising first pole means having a first polarity and defining S-shaped and zigzag-shaped routes of a cart movement, and second pole means having a second polarity and defining a predetermined route of the cart movement; burying the magnetic means under a ground surface of the course to form a marker line in a moving direction of the cart; and sensing a polarity of a respective one of said first and second pole means for switching movement of the cart between the one of S-shaped and zigzag-shaped routes and the predetermined route for moving the cart along the marker line.

* * * * *